Aug. 11, 1959  H. CARTOUX  2,899,477
SAFETY DEVICE FOR REMOTELY CONTROLLED MANIPULATORS
Filed Oct. 15, 1956  2 Sheets-Sheet 1
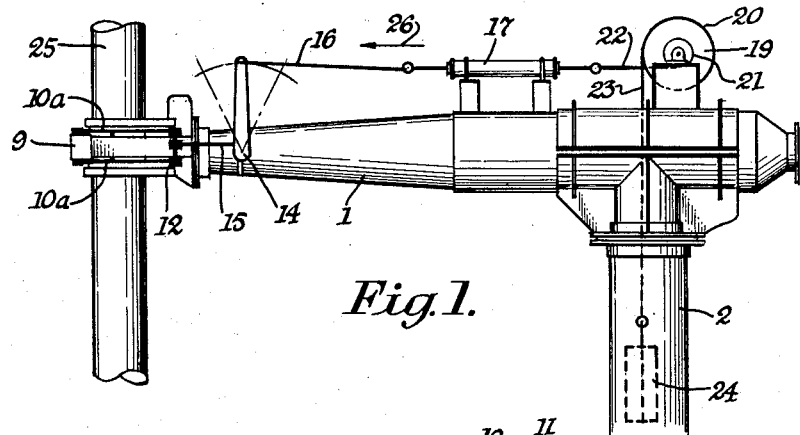
*Fig. 1.*
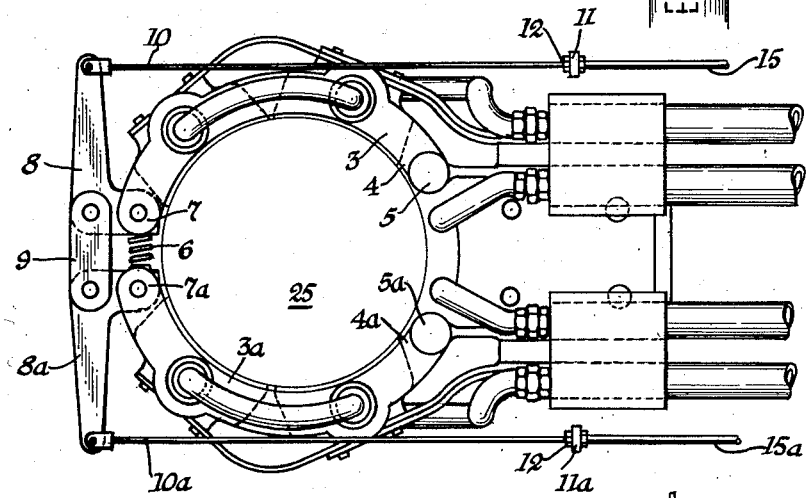
*Fig. 2.*
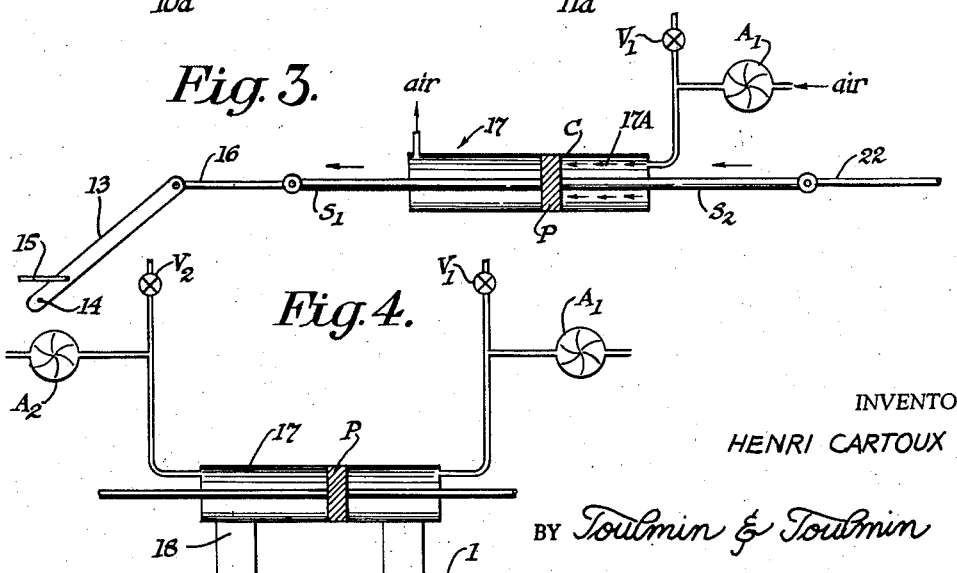
*Fig. 3.*
*Fig. 4.*
INVENTOR
HENRI CARTOUX
BY Toulmin & Toulmin
ATTORNEYS Aug. 11, 1959      H. CARTOUX      2,899,477
SAFETY DEVICE FOR REMOTELY CONTROLLED MANIPULATORS
Filed Oct. 15, 1956      2 Sheets-Sheet 2

INVENTOR
HENRI CARTOUX

BY Toulmin & Toulmin
ATTORNEYS tent Office 2,899,477
Patented Aug. 11, 1959

2,899,477

SAFETY DEVICE FOR REMOTELY CONTROLLED MANIPULATORS

Henri Cartoux, Chedde, France, assignor to H. C. Pechiney, Compagnie de Produits Chimiques et Electrometallurgiques, Paris, France Application October 15, 1956, Serial No. 616,074

Claims priority, application France October 28, 1955

5 Claims. (Cl. 13—16)

The present invention relates to a remotely controlled manipulator having a power circuit and adapted for handling electrodes and the like, more particularly, to a safety arrangement comprising a system of levers and a counterweight to maintain the manipulator clamping jaws closed in the event of failure of the manipulator power circuit.

It is the principal objection of this invention to provide a safety arrangement for a remotely controlled manipulator which is independent of external power circuits.

It is another object of this invention to provide a structure to maintain manipulator clamping jaws tightly gripping an object in the event of failure of the power circuit.

It is a further object of this invention to provide a lighter weight and less cumbersome safety arrangement for remotely controlled manipulators.

It is an additional object of this invention to provide a device to permit more precise gripping and centering of electrodes of varying diameters.

It is still another object of this invention to provide a device which enables the manipulator clamping jaws to evenly and uniformly grip the electrodes over a substantial portion of the periphery of the electrode.

Other objects and advantages of this invention will become apparent upon reference to the accompanying description when taken in conjunction with the following drawings wherein:

Figure 1 is a side elevational view of the manipulator and the arrangement of this invention;

Figure 2 is a top plan view of the manipulator clamping jaws and of the portion of the safety arrangement which is connected to the clamping jaws;

Figures 3 and 4 are schematic views of the jack and show both single and double acting jacks;

Figure 5:
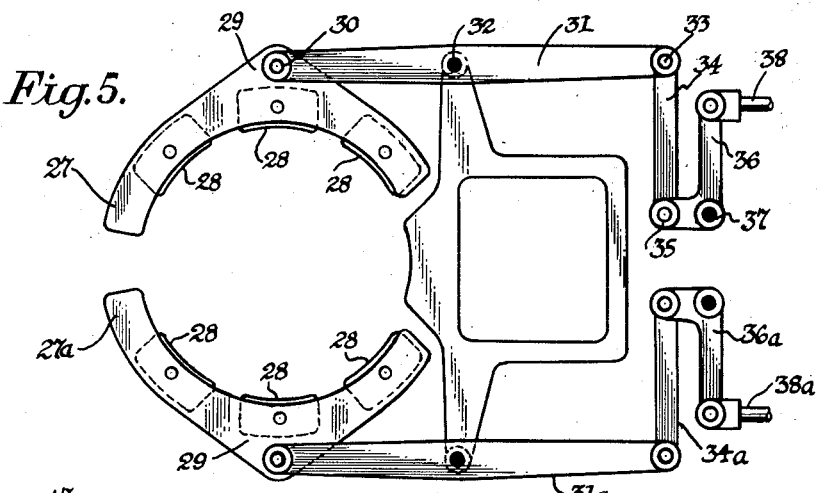
Figure 5 is a top plan view similar to Figure 2 of the modification of the safety device shown in Figure 2.

The present invention essentially comprises a system of levers, links and rods which are connected to manipulator clamping jaws so as to open and close the jaws. The linkage system is connected through a pneumatic jack to a counterweight which, under the action of gravity and the connections to the manipulator clamping jaws, maintains the manipulator clamping jaws closed even upon the failure of the external power circuit of the manipulator. The specific embodiment of this invention, together with several modifications thereof will be next described in detail.

Returning now to the drawings and more particularly to Figure 1, wherein like reference symbols indicate the same parts throughout the various views, 1 indicates a laterally extending cylindrical arm of the manipulator with one end being mounted upon a hollow cylindrical supporting column 2.

As may be best seen in Figure 2, a pair of arcuate clamping jaws 3 and 3a have their inner ends 4 and 4a pivotally mounted at 5 and 5a on the extreme end of the laterally extending arm 1. A coil spring 6 is mounted between the outer ends 7 and 7a of the clamping jaws to urge the clamping jaws open. A plurality of smaller springs may be mounted in place of the single spring 6.

Levers 8 and 8a in the form of crank arms are pivotally mounted on the outer ends of the clamping jaws. A link 9 pivotally interconnects the elbow of the crank levers 8 and 8a. Rods 10 and 10a connect the outer ends of the crank arms 8 and 8a with transverse bars 11 and 11a through electrically insulating members 12.

As may be seen in Figure 1, there are two vertically spaced duplicate sets of crank arms, links and rods which are connected to substantially the top and bottom portions of the clamping jaws 3. Thus, a pair of connecting rods are connected to each one of the transverse bars 11 and 11a.

A lever 13, the lower portion of which is forked to straddle the arm 1, is pivotally mounted at 14 to the outwardly extending arm 1. Rods 15 and 15a connect each of the transverse bars 11 with one of the forks of the lever 13 immediately above the pivot point.

A rod 16 connects the outer end of the lever 13 with one of the piston rods or the pushing end of a single acting pneumatic jack 17 which is rigidly mounted by a non-magnetic steel frame comprising uprights 18 on the laterally extending arm 1. Encircling brackets or bands attach the cylinder of the jack 17 to the tops of the uprights 18. If desired, a double acting jack may be used.

A dual pulley 19 which has a sheave 20 of larger diameter and a sheave 21 of a smaller diameter is mounted adjacent the rear end of the laterally extending arm 1. A flexible cable 22 connects the other of the piston rods or the pulling end of the pneumatic jack 17 with the smaller diameter sheave 21 and is wound therearound. Another flexible cable 23 is wound around the larger diameter sheave 20 and on the end thereof is connected a counterweight 24 which is disposed within the hollow supporting column 2.

The operation of the jack 17 will be described with reference to Figures 3 and 4. In Figure 3 there is shown a cylinder C wherein a piston P slides, provided with piston rods $S_1$ and $S_2$. This jack has a simple effect, i. e., that it is possible to obtain pressure only on the right side of the piston P, as marked by the arrows 17A. The air pressure is obtained by the action of a pump $A_1$ while the valve $V_1$ is closed; the piston P is thus displaced towards the left of the drawing. As a consequence of this displacement, the piston rod $S_1$ pushes the rod 16 and then the piston rod $S_2$ pulls the cable 22. Accordingly, the jack operates against the action of the counterweight 24. This operation opens the jaws of the clamp. The pump $A_1$ is so chosen that it is able to develop a power greater than that force which opposes the counterweight. The closing of the clamp is obtained by the action of the counterweight 24; it is sufficient to open valve $V_1$ (the pump $A_1$ being stopped) so that the cable 22 pulled to the right by the counterweight 24, pulls the piston rod $S_2$ to the right— thus causing the free displacement (still to the right) of the piston P. The result thereof is the displacement to the right of the entire group constituted by piston rod $S_1$, rod 16, lever 13, rod 15, etc., and the closing of the jaws 3.

Figure 4 shows the same jack 17 mounted as a double-acting jack. In this case two means are used for exerting the pressure, one on each side of the piston P. When the piston is made to operate from right to left, the pump $A_1$ is used while valve $V_1$ is closed and valve $V_2$ is open. In order to have the piston move from left to right, one makes the pump $A_2$ work with $V_2$ being closed and $V_1$ being open.

With the above-described arrangement, it can be seen that through the lever arm ratios of the pulley 19 and the forked lever 13 the counterweight 24 can exert a sufficient force to maintain the clamping jaws 3 in close gripping engagement with an electrode 25 which is supported therein. The path of the force exerted by the counterweight 24 is as follows: Through the cable 23, to the pulley 19, through cable 22, to the pneumatic jack 17, through the rod 16 which exerts a torque on the lever 13. This torque, in turn, exerts a clockwise movement 13 as seen in Figure 1 which causes the rod 15 to draw the transverse bars 11 toward the right which force is transmitted through the rod 10 which pivots the crank levers 8 about the connection with the link 9 to urge the ends of the clamping jaws toward each other to closely grip the electrode 25.

When it is desired to release the electrode from the gripping force exerted by the counterweight, it is only necessary to actuate the pneumatic jack 17 to move the rod 16 to the left in the direction of the arrow 26. This will move the rods 10 to the left to rotate the crank arms 8 about the connecting link pivotal connection to enable the outer ends of the clamping jaws to be urged apart by the action of the spring 6. The cable 22 is simultaneously moved to the left by the jack 17.

As an alternative to the above-described construction, there may be substituted in place of the spring 6 a considerably weaker spring which, by itself, does not act to open the clamping jaws but rather compensates for any play due to the connections between the various links, levers and rods.

Proceeding next to Figure 5, there is illustrated a modification of the subject invention wherein the control levers instead of acting on the extreme ends of the clamping jaws exert a force at substantially the mid-points of the jaws. This modification has the advantage of comparatively free access to the front ends of the clamping jaws. In addition, because of the leverage secured by this particular lever arrangement a greater gripping force may be obtained from the clamping jaws.

In the modification of Figure 5 there are shown arcuate clamping jaws 27 and 27a each of which has a plurality of pivotally-mounted gripping elements 28. At the mid-point of each of the jaws is an enlarged portion 29 which is pivotally connected by a pin 30 to a lever 31 which, in turn is pivotally mounted at its mid-point 32 upon a fixed portion of the laterally extending arm 1. The other end of the lever 31 is connected by a pin 33 to a lever 34 which is pivotally connected by a pin 35 to the shorter arm of a crank lever 36 pivotally mounted at 37 on the laterally extending arm 1. The longer arm of the crank lever 36 is connected by rods 38 to the transverse bar 11 as described in connection with the embodiment of the invention illustrated in Figures 1 and 2.

With this lever arrangement, the force exerted upon the rods 38 by the counterweight 24 will pivot the crank lever 36 clockwise as seen in Figure 5 which movement will be transmitted through the connecting link 34 which will rotate the lever 31 in counterclockwise direction. This movement of the lever 31 will move the clamping jaw 27 connected thereto toward the jaw 27a. Concurrently the lever system connected to the jaw 27a will similarly move the jaw 27a toward the jaw 27. The simultaneous movement toward each other of the two clamping jaws will result in a tight gripping action of the electrode supported therein.

This modification is particularly suitable for use with electrodes of great diameter and is most beneficially used together with a double acting pneumatic jack.

Figure 6:
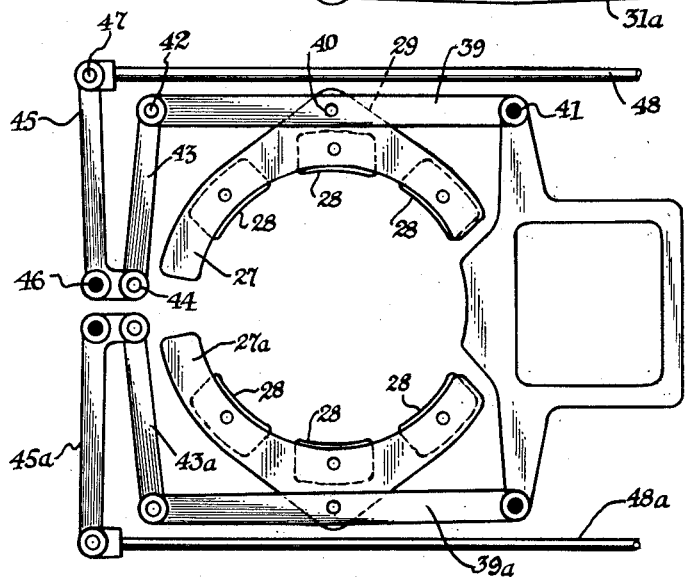
Figure 6 is a top plan view similar to Figures 2 and 3 of a second modification of the safety device.
Figure 7:
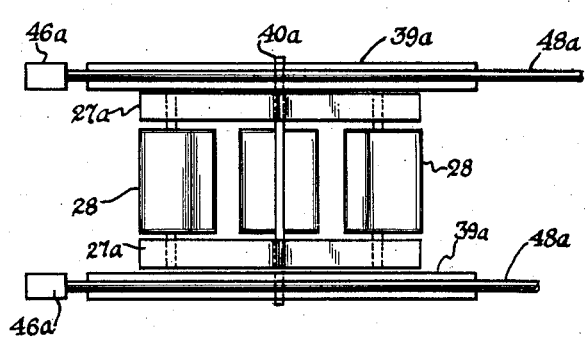
Figure 7 is a side elevational view of the structure illustrated in Figure 6.

In Figures 6 and 7 are shown another modification of the subject invention. In this modification, the lever system which actuates the clamping jaws is positioned in front of the outer ends of the clamping jaws.

The clamping jaws are the same as described in the modification of Figure 5. A lever 39 is pivotally connected at its mid-point 40 the enlarged portion 29 of the clamping jaw 27. One end of the lever 39 is pivotally connected at 41 to a fixed portion of the manipulator arm 1. The other end 42 of the lever 39 is connected to a link 43 which is pivotally connected at 44 to the shorter arm of the crank lever 45 which is pivotally connected at its elbow 46 to a fixed portion of the manipulator arm 1. The longer arm of the crank lever is pivotally connected at 47 to a rod 48 which is connected to the transverse bar 11 in the manner previously described.

In order to obtain uniform gripping action by the clamping jaws, there are two sets of levers and linkages which are vertically spaced, such as illustrated in Figure 7. In this manner, the force exerted by the clamping jaws is distributed over a substantial portion of the periphery of the electrode.

With the modifications of Figures 6 and 7, the force exerted by the counterweight 24 will move the rods 48 to the right as viewed in Figure 6. This movement of the rods, in turn, will rotate the crank arm 45 in a clockwise direction which rotary movement transmitted to the link 43 will cause the lever 39 to move the clamping jaw 27 toward the clamping jaw 27a. The simultaneous movements of both clamping jaws will result in a gripping force exerted against the electrode.

Thus, it can be seen that the subject invention has provided a safety device which through the action of a counterweight actuates a system of links, levers and rods to maintain the clamping jaws closed in the event of failure of the external power circuit such as electric or hydraulic which is commonly used in remotely controlled manipulators.

It will be understood that this invention is susceptible to modification in order to adapt it to different usages and conditions, and, accordingly, it is desired to comprehend such modifications within this invention as may fall within the scope of the appended claims.

What is claimed is:

1. In a remotely controlled manipulator having a power circuit for operation thereof for gripping electrodes and the like, a pair of levers pivotally mounted at substantially their mid-points on a fixed portion of said manipulator, a pair of clamping jaws pivotally mounted at substantially their mid-points on the outer ends of said levers, a lever system connected to the inner ends of each of said first-mentioned levers to pivot said levers about their pivot points, a counterweight, means connecting said counterweight to said lever system with said counterweight normally urging said system and levers to maintain said clamping jaws closed, and means acting on said connecting means to selectively overcome the effect of said counterweight and to open said clamping jaws through said lever systems.

2. A remotely controlled manipulator having a power circuit for the operation thereof for gripping electrodes and the like, a pair of levers pivotally mounted at their inner ends to a fixed portion of said manipulator, a pair of clamping jaws pivotally mounted at their mid-points to the mid-points of said levers, a lever system connected to the outer ends of said first-mentioned levers and positioned outwardly of the outer ends of said clamping jaws for pivoting said first-mentioned levers to open and close said clamping jaws, a counterweight, means connecting said counterweight to said lever system with said counterweight normally urging said lever system to maintain said clamping jaws closed, and means acting on said connecting means to selectively overcome the effect of said counterweight and to open said clamping jaws through said lever systems.

3. A remotely controlled manipulator as claimed in claim 2 with a second set of levers and lever systems vertically spaced from said first-mentioned levers and lever systems, and means interconnecting said spaced sets of levers and lever systems.

4. A remotely controlled manipulator as claimed in claim 2 with a second set of levers and lever systems vertically spaced from said first-mentioned levers and lever systems, and means interconnecting said spaced sets of levers and lever systems.

5. In a remotely controlled manipulator having a power circuit for operation thereof for gripping electrodes and the like, a pair of levers pivotally mounted on a fixed portion of said manipulator, a pair of clamping jaws pivotally mounted at substantially their mid-points on said levers so that free access is provided to the front ends of said jaws, a lever system connected to one end of each of said first-mentioned levers to pivot said levers about their pivot points to exert forces at the mid-points of said clamping jaws, a counterweight, means connecting said counterweight to said lever systems with said counterweight normally urging said system and levers to maintain said clamping jaws closed, and means acting on said connecting means to selectively overcome the effect of said counterweight and to open said clamping jaws through said lever systems.

References Cited in the file of this patent

UNITED STATES PATENTS

| | | |
|---|---|---|
| 1,065,380 | Marshall | June 24, 1913 |
| 1,702,359 | Molmark | Feb. 19, 1929 |
| 2,071,937 | Payne | Feb. 23, 1937 |
| 2,133,305 | Payne | Oct. 18, 1938 |
| 2,148,834 | Payne | Feb. 28, 1939 |

FOREIGN PATENTS

| | | |
|---|---|---|
| 609,461 | Germany | Feb. 15, 1935 |